United States Patent
Khalifeh et al.

(10) Patent No.: US 10,611,381 B2
(45) Date of Patent: Apr. 7, 2020

(54) DECENTRALIZED MINIMUM RISK CONDITION VEHICLE CONTROL

(71) Applicant: Ford Global Technologies, LLC, Dearborn, MI (US)

(72) Inventors: Ahmad Khalifeh, Austin, TX (US); Beni Tang, Ann Arbor, MI (US); Kathryn Hamilton, West Bloomfield, MI (US); Sagar Avaneendra Tatipamula, Canton, MI (US); Sandro Patrick Nuesch, Ann Arbor, MI (US); Rashmi Hegde, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/792,029

(22) Filed: Oct. 24, 2017

(65) Prior Publication Data

US 2019/0118827 A1  Apr. 25, 2019

(51) Int. Cl.
*B60W 50/029* (2012.01)
*B60W 50/02* (2012.01)
*G05D 1/00* (2006.01)

(52) U.S. Cl.
CPC ...... *B60W 50/029* (2013.01); *B60W 50/0205* (2013.01); *G05D 1/0055* (2013.01); *B60W 2050/021* (2013.01); *G05D 2201/0213* (2013.01)

(58) Field of Classification Search
CPC .......... B60W 50/029; B60W 50/0205; B60W 2050/021; G05D 1/0055; G05D 2201/0213
See application file for complete search history.

(56) References Cited

U.S. PATENT DOCUMENTS

| | | |
|---|---|---|
| 5,410,304 A | 4/1995 | Hahn et al. |
| 6,330,499 B1 | 12/2001 | Chou et al. |
| 6,351,709 B2 | 2/2002 | King et al. |
| 6,438,491 B1 | 8/2002 | Farmer |
| 7,486,802 B2 | 2/2009 | Hougen |
| 7,502,718 B2 | 3/2009 | Kanamaru |
| 7,908,060 B2 | 3/2011 | Basson et al. |

(Continued)

FOREIGN PATENT DOCUMENTS

| | | |
|---|---|---|
| CN | 101446830 A | 6/2009 |
| CN | 102752360 A | 10/2012 |

(Continued)

OTHER PUBLICATIONS

Final Office Action dated Oct. 5, 2018 for U.S. Appl. No. 15/236,780 (70 pages).

(Continued)

*Primary Examiner* — Nicholas Kiswanto
(74) *Attorney, Agent, or Firm* — Frank A. MacKenzie; Bejin Bieneman PLC (57) ABSTRACT

A vehicle computer includes a memory and a processor programmed to execute instructions stored in the memory. The instructions include receiving a first minimum risk condition (MRC) event recommendation from a first platform controller and a second MRC event recommendation from a second platform controller, selecting one of the first and second MRC event recommendations as a selected MRC event, controlling an autonomous host vehicle according to the selected MRC event.

18 Claims, 3 Drawing Sheets

(56) References Cited

U.S. PATENT DOCUMENTS

| | | | |
|---|---|---|---|
| 8,019,501 B2 | 9/2011 | Breed | |
| 8,099,308 B2 | 1/2012 | Uyeki | |
| 8,190,355 B2 | 5/2012 | Emam et al. | |
| 8,392,111 B2 | 3/2013 | Ryu et al. | |
| 8,751,154 B2 | 6/2014 | Zhang et al. | |
| 8,825,270 B2 * | 9/2014 | Chen | G07C 5/0808 701/29.6 |
| 8,849,496 B2 | 9/2014 | Miyamoto et al. | |
| 8,874,267 B1 | 10/2014 | Dolgov et al. | |
| 8,874,305 B2 | 10/2014 | Dolgov et al. | |
| 8,874,360 B2 | 10/2014 | Klinger et al. | |
| 8,924,067 B2 * | 12/2014 | Halder | B60W 50/0205 701/2 |
| 8,924,071 B2 | 12/2014 | Stanek et al. | |
| 8,996,235 B2 | 3/2015 | Singh et al. | |
| 9,157,752 B1 | 10/2015 | Fernandez et al. | |
| 9,224,053 B1 | 12/2015 | Ferguson et al. | |
| 9,346,400 B2 | 5/2016 | Attard et al. | |
| 9,368,026 B1 | 6/2016 | Herbach et al. | |
| 9,442,487 B1 | 9/2016 | Ferguson et al. | |
| 9,481,367 B1 * | 11/2016 | Gordon | B60W 30/09 |
| 9,487,212 B1 | 11/2016 | Adam et al. | |
| 9,523,984 B1 | 12/2016 | Herbach et al. | |
| 9,529,361 B2 * | 12/2016 | You | B60W 50/029 |
| 9,805,423 B1 | 10/2017 | Konrardy et al. | |
| 9,841,767 B1 | 12/2017 | Hayward | |
| 9,903,728 B2 | 2/2018 | Powers et al. | |
| 9,940,761 B2 | 4/2018 | Kundu et al. | |
| 10,049,505 B1 | 8/2018 | Harvey et al. | |
| 10,054,947 B2 | 8/2018 | Mays | |
| 10,083,547 B1 | 9/2018 | Tomatsu | |
| 10,086,782 B1 | 10/2018 | Konrardy et al. | |
| 2002/0193923 A1 | 12/2002 | Toyama et al. | |
| 2004/0193334 A1 | 9/2004 | Carlsson et al. | |
| 2004/0217852 A1 | 11/2004 | Kolls | |
| 2008/0084283 A1 | 4/2008 | Kalik | |
| 2008/0161987 A1 | 7/2008 | Breed | |
| 2010/0205132 A1 | 8/2010 | Taguchi | |
| 2010/0228419 A1 | 9/2010 | Lee et al. | |
| 2010/0332121 A1 | 12/2010 | Okude et al. | |
| 2011/0050461 A1 | 3/2011 | Pixley et al. | |
| 2012/0083959 A1 | 4/2012 | Dolgov et al. | |
| 2012/0123951 A1 | 5/2012 | Hyatt et al. | |
| 2013/0238170 A1 | 9/2013 | Klinger | |
| 2014/0136045 A1 | 5/2014 | Zhu et al. | |
| 2014/0309806 A1 | 10/2014 | Ricci | |
| 2014/0358353 A1 | 12/2014 | Ibanez-Guzman et al. | |
| 2015/0149021 A1 | 5/2015 | Duncan et al. | |
| 2015/0178998 A1 | 6/2015 | Attard et al. | |
| 2015/0203112 A1 | 7/2015 | Duncan et al. | |
| 2015/0203113 A1 | 7/2015 | Duncan et al. | |
| 2015/0235480 A1 | 8/2015 | Cudak et al. | |
| 2015/0241225 A1 | 8/2015 | Liu et al. | |
| 2015/0348335 A1 | 12/2015 | Ramanujam | |
| 2016/0009295 A1 | 1/2016 | Chun et al. | |
| 2016/0147226 A1 | 5/2016 | Akselrod et al. | |
| 2017/0032585 A1 | 2/2017 | Stenneth | |
| 2017/0039785 A1 | 2/2017 | Richter et al. | |
| 2017/0072967 A1 | 3/2017 | Fendt et al. | |
| 2017/0090480 A1 | 3/2017 | Ho et al. | |
| 2017/0169628 A1 * | 6/2017 | Schroeder | G05D 1/0088 |
| 2017/0274901 A1 | 9/2017 | Herbach et al. | |
| 2017/0341575 A1 | 11/2017 | Hauler | |
| 2017/0357859 A1 | 12/2017 | Jain et al. | |
| 2017/0372431 A1 | 12/2017 | Perl et al. | |
| 2018/0003515 A1 | 1/2018 | Saru et al. | |
| 2018/0037112 A1 | 2/2018 | Otake | |
| 2018/0046182 A1 | 2/2018 | Joyce et al. | |
| 2018/0052463 A1 | 2/2018 | Mays | |
| 2018/0059687 A1 | 3/2018 | Hayes et al. | |
| 2018/0080777 A1 | 3/2018 | Nimchuk et al. | |
| 2018/0081374 A1 | 3/2018 | Nimchuk et al. | |
| 2018/0082383 A1 | 3/2018 | Bogovich et al. | |
| 2018/0268695 A1 | 9/2018 | Agnew et al. | |
| 2018/0365902 A1 | 12/2018 | Tomatsu | |
| 2019/0001941 A1 * | 1/2019 | Westlund | G05D 1/0088 |
| 2019/0056735 A1 * | 2/2019 | Koopman | G05D 1/0088 |
| 2019/0079513 A1 * | 3/2019 | Greenfield | G05D 1/0077 |

FOREIGN PATENT DOCUMENTS

| | | |
|---|---|---|
| CN | 105867351 A | 8/2016 |
| CN | 104169976 B | 5/2017 |
| CN | 103632211 B | 6/2017 |
| JP | 2009187424 A | 8/2009 |
| JP | 5022272 B2 | 9/2012 |
| JP | 2017081382 A | 5/2017 |
| WO | 2014148976 A1 | 9/2014 |

OTHER PUBLICATIONS

Search Report from United Kingdom Intellectual Property Office dated Dec. 6, 2017 regarding Application No. GB1712796.0 (4 pages).

"Smarter Car—A System and Method for Detecting and Alerting to Vehicle Blind Spots", Aug. 26, 2015, retrieved from the Internet URL: https://priorart.ip.com/IPCOM/000242877 (2 pages).

Non-Final Office Action dated Apr. 4, 2018; U.S. Appl. No. 15/236,780, filed Aug. 15, 2016; (55 pages).

Non-Final Office Action dated Apr. 18, 2019 for U.S. Appl. No. 15/236,780 (60 pages).

Non-Final Office Action for U.S. Appl. No. 15/898,412 as issued by the U.S. Patent and Trademark Office dated Dec. 13, 2019.

* cited by examiner

DECENTRALIZED MINIMUM RISK CONDITION VEHICLE CONTROL

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Fully autonomous vehicles, such as level 5 autonomous vehicles, must be prepared to navigate highly complex traffic situations without human intervention. Minimum risk condition (MRC) parameters define how the autonomous vehicle will respond to certain types of failures. That is, the autonomous vehicle can determine which minimum risk condition event to execute in response to a particular failure. The minimum risk condition event is an action taken by the autonomous vehicle. Examples of minimum risk condition events, in increasing order of severity, include doing nothing, pulling over to the side of the road at an ideal location, pulling over to the side of the road immediately, and stopping the autonomous vehicle in its lane.

An example vehicle computer that can execute decentralized MRC control includes a memory and a processor. The processor is programmed to execute instructions stored in the memory. The instructions include receiving a first minimum risk condition (MRC) event recommendation from a first platform controller and a second MRC event recommendation from a second platform controller. The instructions further include selecting one of the first and second MRC event recommendations as a selected MRC event and controlling an autonomous host vehicle according to the selected MRC event.

In the vehicle computer, the processor may be programmed to receive the first and second MRC event recommendations as a result of the first and second platform controllers, respectively, each detecting a vehicle system failure. The vehicle system failure detected by the first platform controller is different from the vehicle system failure detected by the second platform controller.

In the vehicle computer, the processor may be programmed to generate a third MRC event recommendation. In that instance, selecting the selected MRC event includes selecting from among the first, second, and third MRC event recommendations. Further, the processor may be programmed to generate the third MRC event recommendation as a result of the processor detecting a vehicle sensor failure.

In the vehicle computer, the processor may be programmed to control the autonomous host vehicle according to the selected MRC event by outputting motion control signals to at least one of the first platform controller, the second platform controller, and a third platform controller. In that implementation, the processor may be programmed to receive the motion control signals from an autonomous vehicle controller and output the motion control signals to at least one of the first platform controller, the second platform controller, and the third platform controller.

In the vehicle computer, the processor may be programmed to select one of the first and second MRC event recommendations as the selected MRC event based on a severity associated with the first MRC event recommendation and a severity associated with the second MRC event recommendation. The severities of the first MRC event recommendation and the second MRC event recommendation are different. In that implementation, the processor may be programmed to select the first MRC event recommendation as the selected MRC event as a result of determining that the severity associated with the first MRC event recommendation is greater than the severity associated with the second MRC event recommendation. The processor may be programmed to select the second MRC event recommendation as the selected MRC event as a result of determining that the severity associated with the second MRC event recommendation is greater than the severity associated with the first MRC event recommendation.

In the vehicle computer, the processor may be programmed to select a fourth MRC event recommendation based on an aggregate severity of the first MRC event recommendation and the second MRC event recommendation, wherein the fourth MRC event recommendation is different from the first MRC event recommendation and the second MRC event recommendation.

An example vehicle system that implements decentralized MRC control includes a first platform controller programmed to output a first MRC event recommendation and a second platform controller programmed to output a second MRC event recommendation. The vehicle system further includes a minimum risk condition (MRC) controller programmed to receive the first MRC event recommendation and the second MRC event recommendation, select one of the first MRC event recommendation and the second MRC event rfecommendation as a selected MRC event, and control an autonomous host vehicle according to the selected MRC event.

In the vehicle system, the MRC controller may be programmed to receive the first and second MRC event recommendations as a result of the first and second platform controllers, respectively, each detecting a system failure. The system failure detected by the first platform controller is different from the system failure detected by the second platform controller.

In the vehicle system, the MRC controller is programmed to generate a third MRC event recommendation as a result of the MRC controller detecting a vehicle sensor failure.

Selecting the selected MRC event includes selecting from among the first, second, and third MRC event recommendations.

In the vehicle system, the MRC controller may be programmed to control the autonomous host vehicle according to the selected MRC event by outputting motion control signals to at least one of the first platform controller, the second platform controller, and a third platform controller. In that implementation, the MRC controller may be programmed to receive the motion control signals from an autonomous vehicle controller and output the motion control signals to at least one of the first platform controller, the second platform controller, and the third platform controller.

In the vehicle system, the MRC controller may be programmed to select one of the first and second MRC event recommendations as the selected MRC event based on a severity associated with the first MRC event recommendation and a severity associated with the second MRC event recommendation. The severities of the first MRC event recommendation and the second MRC event recommendation are different. The MRC controller may be programmed to select the first MRC event recommendation as the selected MRC event as a result of determining that the severity associated with the first MRC event recommendation is greater than the severity associated with the second MRC event recommendation. The MRC controller may programmed to select the second MRC event recommendation as the selected MRC event as a result of determining that the severity associated with the second MRC event recommendation is greater than the severity associated with the first MRC event recommendation.

A method for decentralized MRC control includes receiving a first minimum risk condition (MRC) event recommendation from a first platform controller, receiving a second MRC event recommendation from a second platform controller, selecting one of the first and second MRC event recommendations as a selected MRC event, and controlling an autonomous host vehicle according to the selected MRC event.

The method may further include generating a third MRC event recommendation and wherein selecting the selected MRC event includes selecting from among the first, second, and third MRC event recommendations.

In the method, selecting one of the first and second MRC event recommendations as the selected MRC event may be based on a severity associated with the first MRC event recommendation and a severity associated with the second MRC event recommendation. The severities of the first MRC event recommendation and the second MRC event recommendation are different, and the first MRC event recommendation is selected as the selected MRC event as a result of determining that the severity associated with the first MRC event recommendation is greater than the severity associated with the second MRC event recommendation and the second MRC event recommendation is selected as the selected MRC event as a result of determining that the severity associated with the second MRC event recommendation is greater than the severity associated with the first MRC event recommendation.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
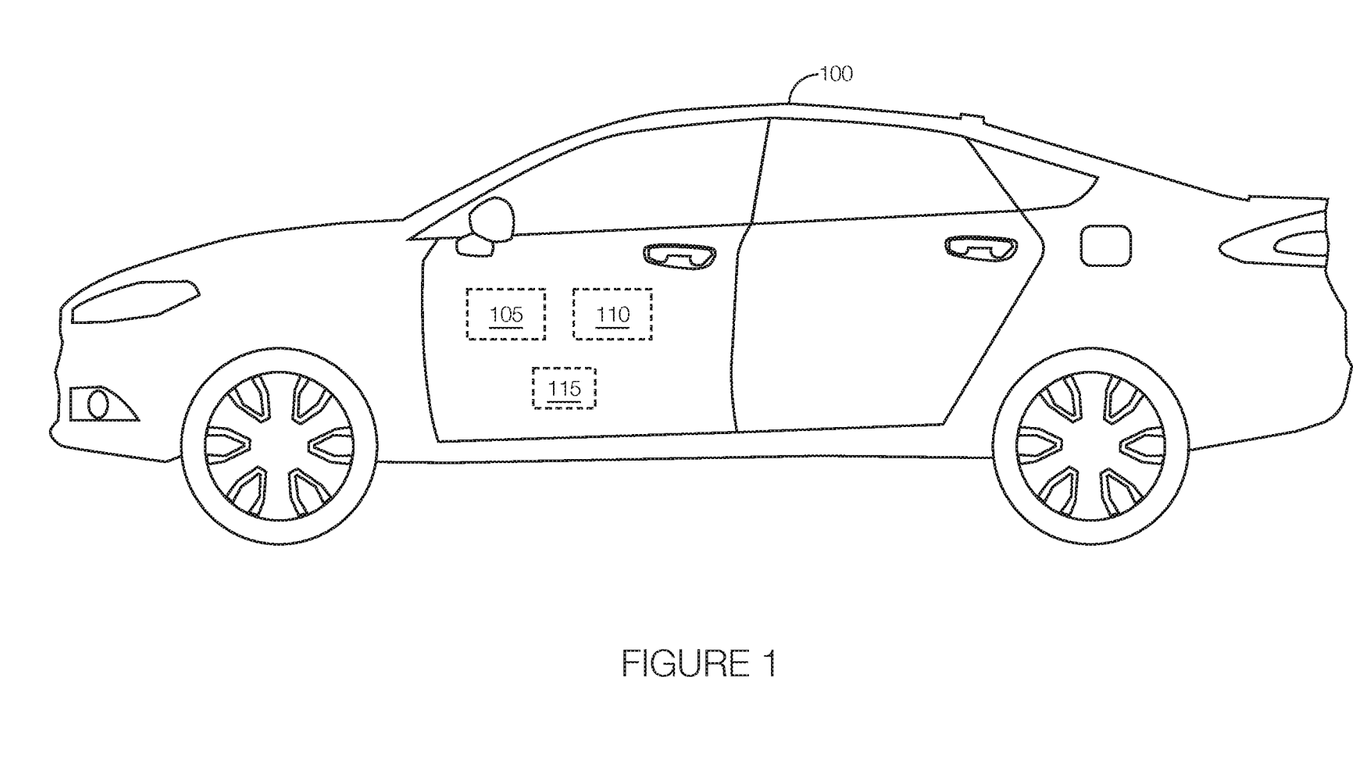
FIG. 1 illustrates an example autonomous vehicle with decentralized minimum risk condition vehicle control.

FIG. 1 illustrates an autonomous host vehicle 100 with decentralized minimum risk condition (MRC) control. As illustrated in FIG. 1, the host vehicle 100 includes a virtual driver system 105, an automated vehicle platform 110, and a minimum risk condition controller, also referred to as an MRC controller 115. At least some parts of the virtual driver system 105 and the MRC controller 115 may be implemented by a vehicle computer. Although illustrated as a sedan, the host vehicle 100 may include any passenger or commercial automobile such as a car, a truck, a sport utility vehicle, a crossover vehicle, a van, a minivan, a taxi, a bus, etc. The host vehicle 100 is an autonomous vehicle that can operate in an autonomous (e.g., driverless) mode, a partially autonomous mode, and/or a non-autonomous mode.

The virtual driving system is a computing platform, implemented via sensors 125, controllers, circuits, chips, and other electronic components, that control various autonomous operations of the host vehicle 100. The virtual driver system 105 includes an autonomous vehicle controller 120 programmed to process the data captured by the sensors 125, which may include a lidar sensor, a radar sensor, a camera, ultrasonic sensors, etc. The autonomous vehicle controller 120 is programmed to output control signals to components of the automated vehicle platform 110 to autonomously control the host vehicle 100 according to the data captured by the sensors 125.

The automated vehicle platform 110 refers to the components that carry out the autonomous vehicle operation upon instruction from the virtual driver system 105, and specifically, from the autonomous vehicle controller 120. As such, the automated vehicle platform 110 includes various actuators 135 (see FIG. 2) incorporated into the host vehicle 100 that control the steering, propulsion, and braking of the host vehicle 100. The automated vehicle platform 110 further includes various platform controllers 130 (sometimes referred to in the art as "modules") (see FIG. 2), such as a chassis controller, a powertrain controller, a body controller, an electrical controller, etc.

The MRC controller 115 is implemented via circuits, chips, or other electronic components that are programmed to autonomously control the host vehicle 100 according to the minimum risk condition events (called "MRC events," below). An MRC event is an action taken by the host vehicle 100 as a result of a system failure. Examples of MRC events, in decreasing order of severity, include stopping the host vehicle 100 in its lane, immediately having the host vehicle 100 pull over to the side of the road, having the host vehicle 100 pull over to the side of the road in the near future (i.e., at an ideal location instead of having the host vehicle 100 do so immediately), or having the host vehicle 100 proceed to its destination. The MRC controller 115 is programmed to select the MRC event according to the type of system failure detected.

Selecting an MRC event includes the MRC controller 115 considering information received from one or more controllers included in the automated vehicle platform 110. Each controller of the automated vehicle platform 110 (e.g., the chassis controller, the powertrain controller, the body controller, the electrical controller, etc.) is programmed to detect failures of one or more vehicle systems associated with the respective controller. For example, the powertrain controller may be programmed to detect various engine or transmission failures. Each controller is programmed to recommend an MRC event based on the type of failure detected. For a minor failure, the platform controller 130 may be programmed to recommend having the host vehicle 100 complete the mission. For a slightly more serious failure, the platform controller 130 may be programmed to recommend that the host vehicle 100 pull over to the side of the road at an ideal location, such as a parking lot, or possibly travel to a service station. For a more serious failure, the platform controller 130 may be programmed to recommend that the host vehicle 100 pull over immediately to, e.g., a shoulder on the side of the road. For the most serious failures, the platform controller 130 may be programmed to recommend that the host vehicle 100 stop immediately, even if the host vehicle 100 is in a driving lane.

The MRC controller 115 is programmed to receive the recommendation from each platform controller 130 in the host vehicle 100. The MRC controller 115 is further programmed to select the MRC event according to the recommendations of the platform controllers 130. The MRC controller 115 may be programmed to select the MRC event associated with the most severe type of vehicle system failure. That is, upon receipt of information indicating that the lighting system and brake system have failed, the MRC controller 115 may be programmed to select the recommendation of the MRC event associated with the brake system failure. In some implementations, the MRC controller 115 may be programmed to provide its own recommendation of the MRC event. For example, the MRC controller 115 may be programmed to detect failures associated with the virtual driver system 105, including failures associated with the sensors 125 included in the virtual driver system 105, failures of the autonomous vehicle controller 120, etc. A failure of the autonomous vehicle controller 120 may be detected by the MRC controller 115 as a result of the autonomous vehicle controller 120 failing to recommend an MRC event when one would otherwise be expected.

When failures are detected, the MRC controller 115 may be programmed to determine its own recommended MRC event that it considers when considering among the MRC events recommended by the platform controllers 130. The MRC controller 115 is programmed to initiate the selected MRC event by commanding the autonomous vehicle controller 120 to autonomously operate the host vehicle 100 according to the selected MRC event. Even still, the MRC controller 115 may arbitrate the different MRC recommendations of the platform controllers 130 and relative to its own recommendation. Further, by allowing the platform controllers 130 to make MRC recommendations, the MRC implementation of the host vehicle 100 is "distributed" or "decentralized," which adds to the robustness of the MRC implementation.

The MRC controller 115 may be incorporated into the autonomous vehicle controller 120, may be a separate device (e.g., a standalone controller operating outside the autonomous vehicle controller 120), or incorporated into a different controller.

Figure 2:
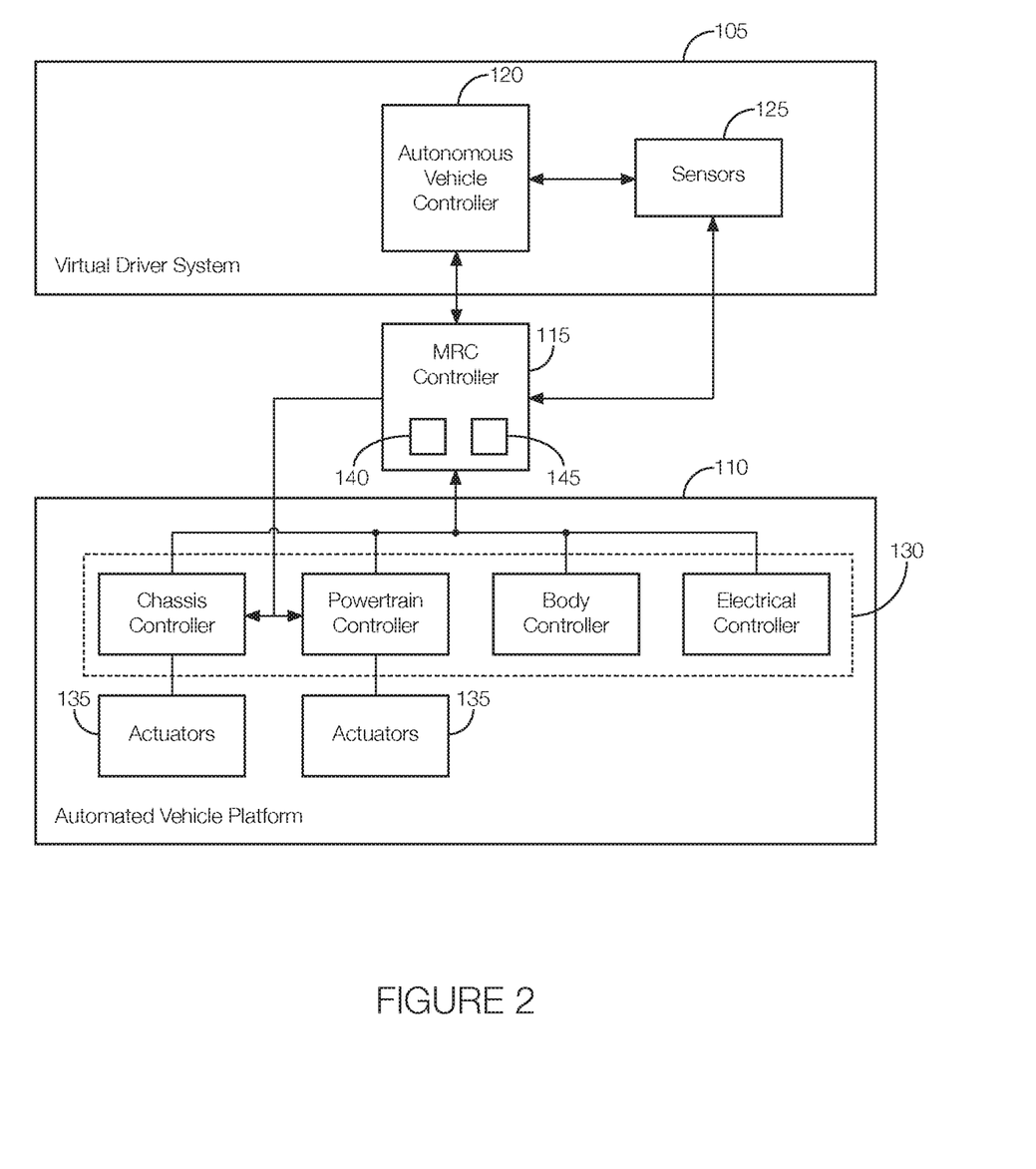
FIG. 2 is a block diagram illustrating an example implementation of the decentralized minimum risk condition vehicle control.

FIG. 2 is a block diagram illustrating one example implementation of decentralized MRC control. Specifically, each platform controller 130 has its own MRC control logic that the respective platform controller 130 executes to provide recommended MRC events to the MRC controller 115. In the implementation of FIG. 2, the MRC controller 115 is separate from the virtual driver system 105 and the automated vehicle platform 110. The MRC controller 115 receives the MRC event recommendations from the various platform controllers 130 of the automated vehicle platform 110, from the autonomous vehicle controller 120, or a combination of both. The MRC controller 115 processes those recommendations, selects one of the recommendations (or otherwise determines its own selected MRC event based on, e.g., sensor data, the aggregate severity of the MRC event recommendations, etc.), and outputs motion control commands to the actuators 135 of the automated vehicle platform 110 to implement the selected MRC event. In some instances, the motion control commands may be generated by the virtual driver system 105 (e.g., by the autonomous vehicle controller 120) and output to the actuators 135 of the automated vehicle platform 110 either directly from the autonomous vehicle controller 120 or via the MRC controller 115.

As shown, the MRC controller 115 includes (or otherwise has access to) a memory 140 and a processor 145. The memory 140 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 140 may store instructions executable by the processor 145 of the MRC controller 115 and data such as tables relating various system failures to various MRC events and logic for arbitrating between different recommended MRC events. The instructions and data stored in the memory 140 may be accessible to the processor 145 and possibly other components of the host vehicle 100.

The processor 145 of the MRC controller 115 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 145 is programmed to receive recommended MRC events and arbitrate among different recommended MRC events by selecting one of the recommended MRC events or possibly a different MRC event. For example, the processor 145 is programmed to receive a first MRC event recommendation output by one of the platform controllers 130 and a second MRC event recommendation output by another of the platform controllers 130. The processor 145 is programmed to select the MRC event from among the first MRC event recommendation and the second MRC event recommendation by, e.g., selecting the recommended MRC event associated with the most severe system failure.

The processor 145 may be further programmed to select a different MRC event, such as an MRC event more severe than the recommended MRC events, upon detection of a failure not represented by the recommended MRC events. In that case, the processor 145 is programmed to detect failures that would not otherwise be detected by one of the platform controllers 130 and generate, e.g., a third MRC event recommendation as a result of detecting those types of failures. Such failures detectable by the MRC controller 115 may include, e.g., failures of one or more of the sensors 125, failures of the autonomous vehicle controller 120, etc. The processor 145 is programmed to select the third MRC event recommendation (i.e., the MRC event associated with the sensor 125 failure) if the failure of the sensor 125 warrants a more severe MRC event than the first and second MRC event recommendations. The processor 145 is programmed to consult the table stored in the memory 140 for the MRC event associated with the sensor 125 failure.

Figure 3:
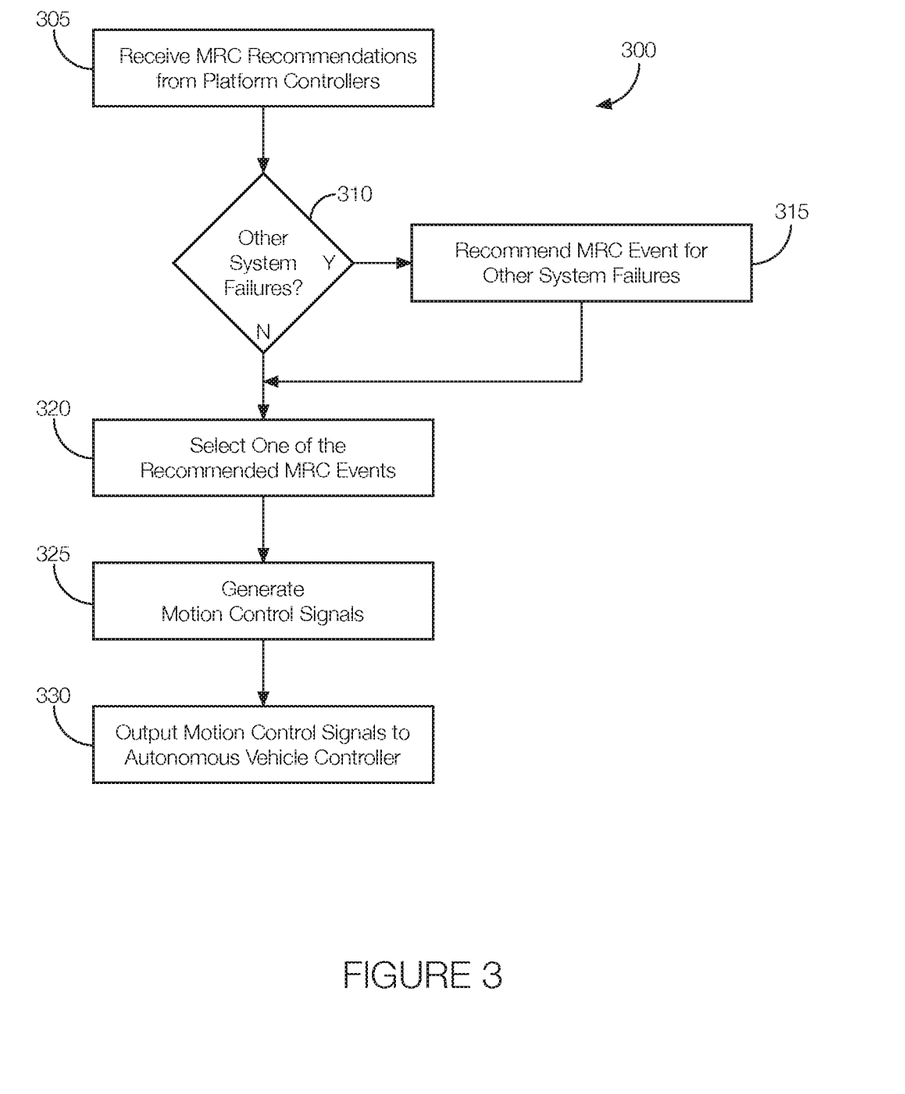
FIG. 3 is a flowchart of an example process for decentralized minimum risk condition vehicle control.

FIG. 3 is a flowchart of an example process 300 that may be implemented by one or more components of the host vehicle 100 to implement decentralized MRC control. The process 300 may begin any time while the host vehicle 100 is operating in an autonomous or partially autonomous mode of operation.

At block 305, the MRC controller 115 receives MRC event recommendations from each of the platform controllers 130 (e.g., the first and second MRC event recommendations discussed above). The MRC controller 115 may receive the MRC recommendations from each of the platform controllers 130 via a communication bus. Each platform controller 130 may generate an MRC event recommendation as a result of that platform controller 130 detecting a vehicle system failure. In some instances, even if no failure is detected, the platform controller 130 may recommend an MRC event recommending the host vehicle 100 complete its mission (i.e., proceed to its destination). The MRC event recommendation may be correlated to a particular system failure in, e.g., a table stored in the memory 140, and the platform controllers 130 may recommend the MRC event by querying the table for the MRC event associated with the system failure and transmitting the recommended MRC event to the MRC controller 115.

At decision block 310, the MRC controller 115 determines if it has detected any other system failures. That is, the MRC controller 115 looks for system failures that would not be detected by any of the platform controllers 130 but that can be detected by the MRC controller 115. For example, the MRC controller 115 may determine if any of the sensors 125 have failed. If the MRC controller 115 determines that at least one sensor 125 has failed, of if there are any other unaccounted-for system failures, the process 300 may proceed to block 315. If the MRC controller 115 determines that there are no other unaccounted-for failures, the process 300 may proceed to block 320.

At block 315, the MRC controller 115 recommends an MRC event based on the failures detected at decision block 310. For instance, if the MRC controller 115 identifies a sensor 125 failure or an autonomous vehicle controller 120 failure, the MRC controller 115 may generate an MRC event recommendation (e.g., the third MRC event recommendation) in accordance with the sensor 125 failure. That is, the MRC event recommendation may be correlated to a particular system failure in, e.g., a table stored in the memory 140. The MRC controller 115 may recommend the MRC event associated with the sensor 125 failure by querying the table.

At block 320, the MRC controller 115 selects one of the recommended MRC events. The recommended MRC events include those received at block 305 and at block 315, if applicable. Thus, the recommended MRC events may include the first MRC event recommendation and the second MRC event recommendation. The MRC event recommendations may further include the third MRC event recommendation, and possibly others. In one possible approach, the MRC controller 115 may be programmed to select the MRC event associated with the most severe action to be taken by the host vehicle 100. In other words, each MRC event recommendation may be associated with a severity, and the MRC controller 115 may be programmed to select the MRC event recommendation with the highest severity. For example, if the first MRC event recommendation includes having the host vehicle 100 pull over to the side of the road immediately and the second MRC event recommendation includes having the vehicle stop in its lane, the MRC controller 115 may be programmed to select the second MRC event recommendation since it is a more severe action to be taken by the host vehicle 100. Alternatively or in addition, the MRC controller 115 may be programmed to select a different MRC event (e.g., a fourth MRC event recommendation) at block 320 than those recommended at blocks 305 and 315 if, e.g., the aggregate severity of the recommended MRC events suggests a more severe action should be taken than the actions reflected by the recommended MRC events.

At block 325, the MRC controller 115 generates motion control signals. The motion control signals may cause the automated vehicle platform 110 to autonomously operate the host vehicle 100 to carry out the selected MRC event. In some instances, the MRC controller 115 may not generate the motion control signals. Rather, the motion control signals may be generated by the virtual driver system 105. In that case, the MRC controller 115 may communicate the selected MRC event to the virtual driver system 105, and the virtual driver system 105 may generate the motion control signals as a result of receiving the selected MRC event.

At block 330, the MRC controller 115 outputs the motion control signals to control the host vehicle 100 according to the selected MRC event. The motion control signal may be output to one or more platform controllers 130, such as the powertrain controller and the chassis controller. The platform controllers 130 that receive the motion control signals may not be the same platform controller 130 that provided the MRC event recommendation that was ultimately selected at block 320. The platform controllers 130, as a result of receiving the motion control signals, may activate various actuators 135 to carry out the selected MRC event. Further, in some instances, the MRC controller 115 may provide motion control signals to one or more of the platform controllers 130 regardless of whether the MRC controller 115 or the virtual driver system 105 generated the motion control signals at block 325. Alternatively or in addition, the virtual driver system 105 may provide some or all of the motion control signals directly to the appropriate platform controller 130.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a memory; and
a processor programmed to execute instructions stored in the memory, the instructions including:
receiving a first minimum risk condition (MRC) event recommendation from a first control module and a second MRC event recommendation from a second control module via a vehicle communication bus to which the first control module, the second control module, and the vehicle computer are connected;
selecting one of the first and second MRC event recommendations as a selected MRC event, the selected MRC event including instructions to one or more actuators; and
based on the selected MRC event and the instructions to the one or more actuators, outputting motion control instructions via the vehicle communications bus to one of the first control module, the second control module, or a third control module to output to the actuators to control an autonomous host vehicle according to the selected MRC event.

2. The vehicle computer of claim 1, wherein the processor is programmed to receive the first and second MRC event recommendations as a result of the first and second control modules, respectively, each detecting a vehicle system failure, wherein the vehicle system failure detected by the first control module is different from the vehicle system failure detected by the second control module.

3. The vehicle computer of claim 1, wherein the processor is programmed to generate a third MRC event recommendation and wherein selecting the selected MRC event includes selecting from among the first, second, and third MRC event recommendations.

4. The vehicle computer of claim 3, wherein the processor is programmed to generate the third MRC event recommendation as a result of the processor detecting a failure associated with a virtual driver system.

5. The vehicle computer of claim 1, wherein the processor is programmed to receive the motion control signals from an autonomous vehicle control module and output the motion control signals to at least one of the first control module, the second control module, and the third control module.

6. The vehicle computer of claim 1, wherein the processor is programmed to select one of the first and second MRC event recommendations as the selected MRC event based on a severity associated with the first MRC event recommendation and a severity associated with the second MRC event recommendation, wherein the severities of the first MRC event recommendation and the second MRC event recommendation are different.

7. The vehicle computer of claim 6, wherein the processor is programmed to select the first MRC event recommendation as the selected MRC event as a result of determining that the severity associated with the first MRC event recommendation is greater than the severity associated with the second MRC event recommendation and wherein the processor is programmed to select the second MRC event recommendation as the selected MRC event as a result of determining that the severity associated with the second MRC event recommendation is greater than the severity associated with the first MRC event recommendation.

8. The vehicle computer of claim 1, wherein the processor is programmed to select a fourth MRC event recommendation based on an aggregate severity of the first MRC event recommendation and the second MRC event recommendation, wherein the fourth MRC event recommendation is different from the first MRC event recommendation and the second MRC event recommendation.

9. A vehicle system comprising:
an automated vehicle platform including a first control module programmed to output a first MRC event recommendation and a second control module programmed to output a second MRC event recommendation, each MRC event recommendation including instructions to one or more actuators; and
a minimum risk condition (MRC) control module programmed to receive the first MRC event recommendation and the second MRC event recommendation from the first and second control modules over a communications bus, select one of the first MRC event recommendation and the second MRC event recommendation as a selected MRC event, and output the instructions associated with the selected MRC event to one of the first control module, the second control module, or a third control module to output to the actuators to control an autonomous host vehicle according to the selected MRC event.

10. The vehicle system of claim 9, wherein the MRC controller is programmed to receive the first and second MRC event recommendations from the first and second control modules, respectively, each detecting a system failure, wherein the system failure detected by the first control module is different from the system failure detected by the second control module.

11. The vehicle system of claim 9, wherein the MRC controller is programmed to detect a vehicle sensor failure and to generate a third MRC event recommendation and wherein selecting the selected MRC event includes selecting from among the first, second, and third MRC event recommendations.

12. The vehicle system of claim 9, wherein the MRC controller is programmed to receive the motion control signals from an autonomous control module and output the motion control signals to at least one of the first control module, the second control module, and the control module.

13. The vehicle system of claim 9, wherein the MRC controller is programmed to select one of the first and second MRC event recommendations as the selected MRC event based on a severity associated with the first MRC event recommendation and a severity associated with the second MRC event recommendation, wherein the severities of the first MRC event recommendation and the second MRC event recommendation are different.

14. The vehicle system of claim 13, wherein the MRC controller is programmed to select the first MRC event recommendation as the selected MRC event as a result of determining that the severity associated with the first MRC event recommendation is greater than the severity associated with the second MRC event recommendation.

15. The vehicle system of claim 13, wherein the MRC controller is programmed to select the second MRC event recommendation as the selected MRC event as a result of determining that the severity associated with the second MRC event recommendation is greater than the severity associated with the first MRC event recommendation.

16. A method comprising:
receiving a first minimum risk condition (MRC) event recommendation from a first control module over a communications bus;
receiving a second MRC event recommendation from a second control module over the communications bus;
selecting one of the first and second MRC event recommendations as a selected MRC event, the selected MRC event including instructions to one or more actuators; and
based on the selected MRC event and the instructions to the one or more actuators, outputting motion control instructions via the vehicle communications bus to one of the first control module, the second control module, or a third control module to output to the actuators to control an autonomous host vehicle according to the selected MRC event.

17. The method of claim 16, further comprising generating a third MRC event recommendation and wherein selecting the selected MRC event includes selecting from among the first, second, and third MRC event recommendations.

18. The method of claim 16, wherein selecting one of the first and second MRC event recommendations as the selected MRC event is based on a severity associated with the first MRC event recommendation and a severity associated with the second MRC event recommendation,
wherein the severities of the first MRC event recommendation and the second MRC event recommendation are different,
wherein the first MRC event recommendation is selected as the selected MRC event as a result of determining that the severity associated with the first MRC event recommendation is greater than the severity associated with the second MRC event recommendation, and
wherein the second MRC event recommendation is selected as the selected MRC event as a result of determining that the severity associated with the second MRC event recommendation is greater than the severity associated with the first MRC event recommendation.

\* \* \* \* \*